(12) United States Patent
Weible

(10) Patent No.: US 9,415,989 B2
(45) Date of Patent: Aug. 16, 2016

(54) APPARATUS AND METHOD FOR AUTOMATICALLY FORMING AND FILLING CONTAINERS, IN PARTICULAR WATER BOTTLES

(75) Inventor: Frank Weible, Kirchheim (DE)

(73) Assignee: Kaercher Futuretech GmbH, Schwaikheim (DE)

( * ) Notice: Subject to any disclaimer, the term of this patent is extended or adjusted under 35 U.S.C. 154(b) by 824 days.

(21) Appl. No.: 13/565,658

(22) Filed: Aug. 2, 2012

(65) Prior Publication Data

US 2013/0019570 A1 Jan. 24, 2013

Related U.S. Application Data

(63) Continuation of application No. PCT/EP2011/051349, filed on Feb. 1, 2011.

(30) Foreign Application Priority Data

Feb. 3, 2010 (DE) .......................... 10 2010 007 401

(51) Int. Cl.
*B67C 7/00* (2006.01)
*B29C 49/42* (2006.01)
(Continued)

(52) U.S. Cl.
CPC ............. *B67C 7/0033* (2013.01); *B29C 49/421* (2013.01); *B29C 49/4205* (2013.01);
(Continued)

(58) Field of Classification Search
CPC ...... B67C 7/00; B67C 7/0006; B67C 7/0026; B29C 31/008
USPC .......................... 53/453, 561, 452; 198/626.1
See application file for complete search history.

(56) References Cited

U.S. PATENT DOCUMENTS

| | | | | | |
|---|---|---|---|---|---|
| 3,531,908 | A | * | 10/1970 | Tuma ...................... | B65B 55/10 |
| | | | | | 141/92 |
| 3,785,116 | A | * | 1/1974 | Munz ...................... | B65B 3/022 |
| | | | | | 425/524 |

(Continued)

FOREIGN PATENT DOCUMENTS

| | | |
|---|---|---|
| DE | 2704657 | 8/1977 |
| DE | 3610362 | 10/1987 |

(Continued)

OTHER PUBLICATIONS

Der ISO Container, http://www.containersucher.com/printable/derisocontainer/index.php (Oct. 2, 2012).

(Continued)

*Primary Examiner* — Gloria R Weeks
(74) *Attorney, Agent, or Firm* — Klarquist Sparkman, LLP

(57) ABSTRACT

An apparatus and method for automatically forming and filling containers, such as water bottles. The apparatus has a plurality of workstations and a conveyer comprising container carriers. The workstations comprise an insertion station, a container forming station, a filling station, a closing station, and an ejection station. The insertion station feeds a container preform into a container carrier. The container forming station forms a container from the container preform. The filling station fills the formed container with a fluid. The closing station closes the filled container with a lid. The conveyer moves the container preform and the container from the insertion station via the container forming station, the filling station and the closing station to the ejection station. The container preform and the container formed from the preform may continuously reside in the container carrier along the whole process beginning with the insertion station and ending with the ejection station.

19 Claims, 8 Drawing Sheets

(51) Int. Cl.
  *B67C 3/00* (2006.01)
  *B67C 3/24* (2006.01)
  *B29C 49/06* (2006.01)
  *B29C 49/64* (2006.01)
  *B67C 3/22* (2006.01)

(52) U.S. Cl.
  CPC . *B67C3/008* (2013.01); *B67C 3/24* (2013.01);
  *B29C 49/06* (2013.01); *B29C 49/6409*
  (2013.01); *B67C 2003/227* (2013.01)

(56) References Cited

U.S. PATENT DOCUMENTS

| | | | |
|---|---|---|---|
| 3,818,785 A * | 6/1974 | Wakabayashi | 82/101 |
| 4,060,164 A | 11/1977 | Reilly | |
| 4,064,987 A * | 12/1977 | Rowan | 198/604 |
| 4,070,428 A | 1/1978 | Krall et al. | |
| 4,208,852 A * | 6/1980 | Pioch | 53/167 |
| 4,614,073 A * | 9/1986 | Argazzi | B65B 19/34 53/446 |
| 4,621,485 A * | 11/1986 | Argazzi | B65B 43/185 493/317 |
| 4,642,975 A | 2/1987 | Langen et al. | |
| 4,757,907 A * | 7/1988 | Hansen | 215/46 |
| 4,807,421 A | 2/1989 | Araki et al. | |
| 5,054,267 A * | 10/1991 | Dundas | 53/477 |
| 5,054,272 A * | 10/1991 | Dundas | 53/561 |
| 5,237,797 A * | 8/1993 | Varlet | 53/420 |
| 6,196,788 B1 * | 3/2001 | Talbot et al. | 414/802 |
| 6,393,803 B1 * | 5/2002 | Luka et al. | 53/411 |
| 7,331,156 B2 * | 2/2008 | Hartness et al. | 53/251 |
| 8,112,969 B2 * | 2/2012 | Backhaus et al. | 53/251 |
| 8,151,544 B2 * | 4/2012 | Till et al. | 53/77 |
| 8,528,304 B2 * | 9/2013 | Miyazaki et al. | 53/440 |
| 8,646,243 B2 * | 2/2014 | Py | 53/284 |
| 8,689,532 B2 * | 4/2014 | Chauvin et al. | 53/561 |
| 2003/0159753 A1 | 8/2003 | Maria | |
| 2004/0187444 A1 * | 9/2004 | Hutchinson et al. | 53/453 |
| 2005/0118057 A1 | 6/2005 | Quetel et al. | |
| 2008/0152538 A1 | 6/2008 | Quetel et al. | |
| 2014/0196415 A1 * | 7/2014 | Drenguis | B08B 9/00 53/493 |

FOREIGN PATENT DOCUMENTS

| | | |
|---|---|---|
| DE | 4314400 | 11/1994 |
| DE | 19702770 | 7/1998 |
| DE | 19928325 | 12/2000 |
| DE | 10016631 | 10/2001 |
| DE | 10322556 | 4/2004 |
| DE | 102004023419 | 12/2005 |
| DE | 102005015565 | 10/2006 |
| DE | 102008035004 | 1/2010 |
| EP | 0266804 | 5/1988 |
| EP | 0522977 | 1/1993 |
| EP | 0950606 | 10/1999 |
| EP | 1559663 | 8/2005 |
| EP | 1660371 | 5/2006 |
| EP | 2138298 | 12/2009 |
| WO | WO02/30752 | 4/2002 |
| WO | WO2005/023652 | 3/2005 |

OTHER PUBLICATIONS

International Preliminary Report on Patentability for PCT Application No. PCT/EP2011/051349 (mailed Feb. 1, 2011).

* cited by examiner

...

APPARATUS AND METHOD FOR AUTOMATICALLY FORMING AND FILLING CONTAINERS, IN PARTICULAR WATER BOTTLES

CROSS-REFERENCE TO RELATED APPLICATIONS

This application is a continuation of International Patent Application No. PCT/EP2011/051349, filed on Feb. 1, 2011, and designating the U.S., which has been published in German and claims priority from German Patent Application No. DE 10 2010 007 401.2 filed on Feb. 3, 2010. The entire contents of these prior applications are incorporated herein by reference.

BACKGROUND

The present invention relates to an apparatus and a method for automatically forming and filling containers, such as water bottles.

Heretofore, such apparatus are primarily used in industry, in particular in the beverage industry. The apparatus (or plants) are operated stationarily and the workstations and conveyers required are permanently installed in a large production building. Stationary plants are designed for high throughput rates which, for example in the field of the beverage industry, might be of the order of up to 40,000 bottles per hour. In order to achieve this, high-performance workstations and conveyers are employed.

EP 0 950 606 B1 discloses a stationary machine for automatically forming and filling containers. For this purpose, this machine has a container forming station designed as a blowing station. By means of the blowing station, bottles are formed from bottle preforms, which are composed of a thermoplastic material, under the action of heat and of compressed air. The bottles are filled in a workstation and are subsequently closed in a closing station. Grippers are used as a conveyer, by means of which the bottles are moved between the individual workstations.

EP 1 606 371 B1 discloses a plant in which a conveyer constructed from clamping jaws is employed. The clamping jaws are arranged on both sides of the bottles, specifically transversely to their transport direction, in each case in the manner of a rake. The bottles are moved forward by the left and right clamping jaws being displaced alternately. Plants are also known, the conveyers of which are constructed from what are known as transport stars, entry stars and exit stars, as is described, for example, in DE 10 2005 015 565 A1 or in DE 199 28 325 A1.

The stationary plants described above have in common that they all have conveyers where the movement of the bottle preforms and of the bottles between the individual workstations involves hand-over movements or grip-around movements. In a gripper-based conveyer, the movement of the bottles takes place in such a way that the bottles are picked up by various grippers in a sequence defined by the processing flow and are thus moved between the individual workstations. Even in the case of a conveyer constructed from transport stars, entry stars and exit stars, the bottles are moved forward by being handed over again and again. In both types of conveyers, the container preform or the container is grasped at a first location, such as at a first workstation, by a transport element, such as a gripper or a transport star, in order then to be delivered at a second location. In a conveyer of rake-like type, the bottles are moved forward by being again and again gripped around by the left and right clamping jaws.

The hand-over movements and grip-around movements involve relative movements. On the one hand, they involve relative movements between a transport element of the conveyer and the article to be transported and thus to be grasped, as is the case in a gripper-based conveyer, a conveyer constructed from transport stars, entry stars and exit stars, or a conveyer of rake-like type. These relative movements are therefore relative movements between a transport element and an article spatially separated from the latter. On the other hand, they involve relative movements between individual transport elements of the conveyer itself, as is the case in a conveyer constructed from transport stars, entry stars and exit stars or a conveyer of rake-like type. In order to enable such relative movements, the individual components of the conveyer must be oriented very accurately with one another and with respect to the workstations when a plant is set up. Comprehensive adjustment and leveling work is therefore necessary when a plant is being set up and can usually be carried out only by specially trained personnel.

The result of the complicated adjustment and leveling work is that the known plants are not suitable for mobile use. A mobile use is desirable, however, when a large number of people are to be catered far away from civilization for a lengthy period of time. Typical applications may include military training exercises or deployments of major military units, but also humanitarian commitments, for example during disaster aid in an earthquake zone. Mobile water treatment devices are already available, inter alia, by the present assignee. By means of mobile water treatment devices, raw water, such as water from a stagnant pool discovered in the region of action can be treated to produce drinking water. However, bottle filling as in the beverage industry has not been possible so far under the rough circumstances of a mobile use.

An apparatus for automatically forming and filling containers for mobile applications should be of highly robust design. On the one hand, it should withstand transport into the region of action. On the other hand, it should function reliably even under rough operating conditions and after setting up and dismantling. Moreover, it should be capable of being put into operation again after a change of location without complicated setting and adjustment work. It should also be simple to repair. The apparatus known from the prior art do not fulfill these requirements.

SUMMARY

Against this background, it is an object of the present invention to provide an apparatus and a method that allow to form and fill containers with water or other kinds of fluids under adverse conditions of use, such as exist during mobile use, for example. It is another object to provide an apparatus and a method that are simple to use and can reliably operated to provide water bottles or other kinds of prefilled containers in large quantities. It is yet another object to provide an apparatus for forming and filling containers, such as water bottles, that has a compact construction which allows transport and deployment using conventional military transport equipment.

In view of the above, there is provided an apparatus for automatically forming and filling containers, comprising a plurality of workstations and a conveyer that comprises a number of container carriers and a number of movement units for moving the container carriers, with the plurality of workstations at least comprising an insertion station, a container forming station, a filling station, a closing station, and an ejection station, with the insertion station being designed for feeding a container preform into one from the number of container carriers, thereby assigning the container preform to said one container carrier, with the container forming station being designed for forming a container from the container preform, with the filling station being designed for filling the container with a fluid, with the closing station being designed for closing the filled container, and with the ejection station being designed for ejecting the filled and closed container out of said one container carrier, wherein the conveyer is designed for moving the container carriers from the insertion station via the container forming station, the filling station and the closing station to the ejection station, and wherein the container preform and the container formed from the preform continuously reside in said one container carrier while the conveyor moves said one container carrier from the insertion station via the container forming station, the filling station and the closing station to the ejection station.

There is also provided a method for automatically forming and filling containers by means of an apparatus which has a conveyer and a plurality of workstations comprising an insertion station, a container forming station, a filling station, a closing station and an ejection station, the method comprising the steps of feeding a container preform into a container carrier by using the insertion station, thereby assigning the container preform to the container carrier; forming a container from the container preform by using the container forming station; filling the formed container with a fluid by using the filling station; closing the filled container by using the closing station; and ejecting the filled and closed container out of the container carrier by using the ejection station; wherein the container carrier is moved from the insertion station via the container forming station, the filling station and the closing station to the ejection station by means of the conveyer; and wherein the container preform and the container formed from the preform continuously reside in the container carrier assigned to the container preform.

The novel apparatus and method are based on the idea of inserting the container preform into a container carrier and of leaving the container preform and the container formed from the preform in this container carrier during the entire processing flow. The container preform and the container are moved together with the container carrier, into which the container preform is inserted at the beginning of a defined processing flow, between the individual workstations (preferably all the workstations). They also remain in the assigned container carrier at the individual workstations. At the container forming station, the container is formed from the container preform inserted into the container carrier. The container then located in the container carrier is subsequently filled at the filling station and closed at the closing station. The assignment of container and container carrier ends only at the ejection station where the closed container is extracted from the container carrier. The container preform and the container formed from the preform are thus moved between the individual workstations, without any hand-over movements or grip-around movements being necessary for this purpose. In the novel apparatus, none of the above-described relative movements occur between the transport element of the conveyer and the article to be transported. The movement of the container preform and of the container between the individual workstations does not involve any relative movement in the sense of a hand-over movement or grip-around movement of the container preform or of the container with respect to the container carrier into which the container preform is inserted.

Since the novel apparatus and the novel method manage without relative movements, they can both be put into operation without complicated setting and adjustment work after the apparatus has been set up, for example even on uneven ground. In addition, in comparison with the known apparatus, the novel apparatus manages with a smaller number of movement-inducing components in order to move a container preform and a container between the individual workstations. Furthermore, in the novel apparatus, these components are of less complex construction. Moreover, the movements or movement sequences to be carried out in order to move the container perform and the container are less complex.

The novel apparatus and the novel method are therefore highly robust and operate reliably even under adverse conditions of use, such as occur, for example, during mobile use. Moreover, the novel apparatus and the novel method can be handled in a simple way and can therefore be put into operation even by persons without much specialized knowledge.

In a refinement of the invention, the movement units are designed for moving the container carrier on a closed trajectory.

This refinement enables the apparatus to have a compact construction. Moreover, it has the effect that the apparatus can be operated easily and the production process can easily be monitored, since the individual workstations can be arranged in a small space and therefore the distances between the individual workstations are short.

In a further refinement, the conveyer has a first and a second movement unit, the first movement unit being designed for moving the container carrier along a first movement direction, the second movement unit being designed for moving the container carrier along a second movement direction, and the second movement direction being oriented essentially orthogonally to the first movement direction.

This refinement has the advantage of simple movement sequences between the individual workstations. The result of this is that the apparatus can be handled simply and operates reliably. Also, this refinement makes it possible to have a compact construction. Preferably, the container carrier is moved away from the insertion station along the first movement direction and is moved toward a second workstation, specifically the container forming station, along the second movement direction.

In a further refinement, the conveyer has a third movement unit which is designed for moving the container carrier along a third movement direction, the third movement direction being oriented essentially orthogonally to the second movement direction.

This refinement, too, makes it possible to implement simple movement sequences and therefore the construction of a compact, simple-to-handle and reliably operating device. Preferably, the container carrier is moved toward a third workstation, specifically the filling station, along the third movement direction.

The conveyer may, in a further refinement, have a fourth movement unit designed for moving the container carrier along a fourth movement direction, the fourth movement direction being oriented essentially orthogonally to the third movement direction.

This refinement makes it possible to have a rectilinear closed movement sequence and therefore a highly compact construction of the device. The container carrier moves on a closed path. Preferably, the container carrier is moved along the fourth movement direction via a third workstation, in particular the closing station, and via a fourth workstation, in particular the ejection station, toward the insertion station.

In a further refinement, the movement units are designed for moving the container carriers in translational motion.

This refinement has the advantage that the container carriers are moved between the individual workstations by means of uniaxial movements. Consequently, the use of grippers, for example, may be dispensed with. Instead, movement units of simple design may be employed. As a result, the novel apparatus can be constructed in a simple way, can be handled simply and also operates reliably. Advantageously, the movement units may be designed as pneumatic cylinders or as electric drives, in particular as servomotors, with servomotors preferably being employed because they are especially simple to handle.

In a further refinement, the movement units are designed for moving the container carriers essentially within a predefined movement plane.

This refinement makes it possible to have a simple movement sequence and therefore a simple-to-handle and reliably operating device. No superposed multiaxial movements are necessary for moving the container carriers between the individual workstations. The apparatus may be designed to be gripper-free. Advantageously, the movement plane lies essentially parallel to a plane which is defined by the ground on which the workstations and the conveyer stand. In other words, in this refinement, the container carriers are moved essentially or even continuously horizontally.

In a further refinement, the insertion station is designed for inserting the container preform into the container carrier from above as a result of a gravity-induced movement.

This refinement makes it possible to insert the container preform into the container carrier in an especially simple way. Since insertion takes place by utilizing gravity and therefore passively, the use of a movement unit, for example a gripper, may be dispensed with. Nor is there any need for adjustment and setting work here. Insertion of the container preform into the container carrier from above consequently has advantages in relation to insertion from below. It is thus possible to construct a simple-to-handle and reliably operating device. Moreover, this makes it possible to construct a simple and reliably operating apparatus which can also be handled in a simple way.

In a further refinement, the container carrier has a spring element which is designed for holding a container preform inserted into the spring element from above and for making it possible to extract a filled container downward.

This refinement makes it possible to implement a container carrier of simple design. The spring element, on the one hand, ensures that a container preform inserted into the container carrier is held reliably. On the other hand, on account of its elastic properties, it makes it possible to extract a filled container, in particular a filled and closed container, without difficulty. Since the body region of a container has a larger diameter than its neck region, the container cannot simply be extracted upward out of the spring element and therefore out of the container carrier. Downward extraction is advantageous. This is possible on account of the elastic properties of the spring element. Moreover, the spring element, because of its simple construction, is a holding component which is beneficial to produce. The spring element performs the actual function of holding the container carrier vertically.

In a further refinement, the spring element is dimensioned such that the filled container falls out downward by itself due to gravity.

This refinement contributes to a simple construction and therefore to simple handling and reliable operation of the apparatus. There is no need for any movement components by means of which the filled container is "actively" extracted out of the container carrier. Instead, extraction takes place passively on account of the intrinsic movement of the filled container. With this dimensioning of the spring element, guidance in the region below the containers is advantageous, commencing with the filling station and as far as the ejection station, so that the filled containers are prevented from falling out of the spring element and therefore out of the container carrier prior to the desired ejection.

In a further refinement, the container preform has a neck region with a collar, the spring element being designed as a thin annular disk with an inner edge and with an outer edge.

In this case, a container preform inserted from above is held by being gripped under its collar, a filled container being extractable downward, as before. This refinement has a number of advantages. The collar in the neck region of the container preform constitutes a defined point on the latter which is preserved even when the forming of the container is taking place in the container forming station. Thus, the container preform and the container formed from the preform can be moved in an unchanged position and attitude through the complete device, i.e., between the individual workstations. Both the container preform and the container are supplied to the individual workstations in a defined position and attitude, and therefore work at the individual workstations, in particular the production and filling of the container, can be carried out reliably. The holding position defined by the collar is a uniform holding position regardless of type and quality of differently designed containers. The novel apparatus can therefore be used for different container forms. Since the container is held in the container carrier by being gripped under the collar, the container can be closed in the closing station, without having to be extracted from the container carrier for this purpose. There is therefore no need for any transfer. Since the spring element is designed as a thin disk, in spite of being positioned below the collar of the container preform it has no influence upon the container blowing operation taking place inside the container forming station. By the container preform and the containers being picked up at their collar, the size and form of the container body has virtually no influence upon the configuration of the conveyer. The conveyer and therefore the apparatus can consequently be converted in a simple way with regard to containers of different volumes and forms.

In a further refinement, the disk has a plurality of slots.

Advantageously, the slots run, commencing at the inner edge of the disk, over part of the ring width into the direction of the outer edge of the disk. This refinement gives the disk a high elasticity. Overall, simple and reliable ejection of the closed container in the ejection station becomes possible, thus contributing to simple handling and reliable operation of the device.

In a further refinement, the workstations and the conveyer are arranged in a transportable enclosure for mobile use of the device.

The workstations and the conveyer and further components required for operating the apparatus are in this case permanently installed in the transportable enclosure, and this takes place, for example, at the factory on the premises of the manufacturer of the apparatus. In particular, the workstations and the conveyer remain in the enclosure for their entire period of use. Advantageously, the encosure is what is known as an "ISO container" designed according to standard ISO 668. With a view to compact construction, especially what is known as a "20-foot container" of type 1C is preferably used, which container is 20 feet long, 8 feet wide and 8 feet high. Alternatively, a "20-foot container" of type 1CC, which is 20 feet long, 8 feet wide and 8 feet 6 inches high, may also be used. An apparatus accommodated in such containers is highly mobile, and can be relocated by land using appropriately equipped transport vehicles, for example, or else can be relocated by air using appropriately equipped transport helicopters.

In a further refinement, the workstations further comprise at least one of the following workstations:
- a heating station designed for preheating a container preform for the subsequent forming of the container which takes place in the container forming station,
- a temperature testing station designed for testing whether a container preform has a temperature lying in a defined temperature range,
- a container testing station designed for testing whether a formed container fulfils a number of predefined forming criteria,
- an irradiation station designed for irradiating a formed container with UV radiation over at least part of its circumference.

What is achieved by using a heating station, a temperature testing station or a container testing station is that the apparatus operates reliably and can be handled in a simple way. By means of the heating station, the container preforms can be heated in such a way that containers can easily be formed from the container preforms in the container forming station with a low rate of defective. Using the temperature testing station and the container testing station, functional disturbances in individual workstations can be detected and therefore counter measures taken, so that damage and, overall, permanent faults do not occur in other workstations. Thus, using a temperature testing station, on the one hand the functioning of the heating station is monitored and, on the other hand, the thermal properties of each individual container preform are checked. If it is found that the temperature of individual preheated container preforms does not lie in the defined temperature range, these container preforms can be sorted out and removed from the production process. Container preforms which are too cold or too hot may burst in the container forming station and therefore jam the forming station or even damage it. If it is found in the temperature testing station that a relatively large number of successive container preforms do not have the correct temperature, this indicates that there is a fault in the heating station. Counter measures can be taken, for example the entire apparatus can be shut down until the fault in the heating station is rectified. The functioning of the container forming station is monitored by the container testing station. In this case, for example, a check is made as to whether the formed container has a predefined form or whether the formed container has, for example, a hole in a side wall or has even burst. Thus, by means of the container testing station, containers of lower quality, for example incompletely formed containers, are detected and can consequently be separated out. A complete stoppage of the apparatus can thus be avoided. Overall, the heating station and the two testing stations make it possible for the apparatus to be handled in a simple way, so that it can be operated even by persons without much specialized knowledge who are able to rectify operating faults which possibly occur.

By means of the irradiation station, preferably the neck region of the formed container is irradiated, in particular the threaded region located there. A container preform usually has a thread already, and therefore the neck region of the container preform is not actively heated in the container forming station, in order to avoid damage to the thread. If germs are located in the neck region or in the threaded region, these are not necessarily killed during the heating of the container preform in the container forming station, whereas germs located in the body region of a container preform are killed because of the high temperature inside the container forming station. Germs located in the neck region or threaded region of the formed container can be efficiently killed by irradiation.

In a further refinement, the conveyer has a return branch.

The return branch is designed for feeding a container preform, for which a check in the temperature testing station has indicated that the temperature does not lie in the predefined temperature range, to the insertion station. This refinement has the advantage that an insufficiently heated container preform can be fed anew to the production process in an automated way. Simple handling of the apparatus is thereby achieved. Advantageously, the return branch can be utilized also in the event of faults occurring at workstations which follow the temperature testing station in the production process. These are, for example, faults at the container forming station or faults at the filling station.

Advantageously, the filling station comprises a prefilling station and a finish-filling station. The container can thus be filled in two stages. Using the prefilling station, a container is filled with a first volume of fluid under higher pressure or with a higher volume flow and therefore quickly. By means of the finish-filling station, the container is filled with a second volume of the fluid under lower pressure or with a lower volume flow and therefore slowly. Preferably, the first volume is greater than the second volume. Advantageously, the first volume corresponds to 80% of the overall volume of the fluid with which the container is to be filled. The second volume consequently corresponds to 20% of the overall volume. By virtue of this refinement, particularly during filling with liquids, foaming is prevented, thus ensuring that the apparatus is simple to handle.

Preferably, the closing station comprises a lid station and a fastening station, the lid station being designed for placing a lid onto the filled container, and the fastening station being designed for releasably fastening the placed-on lid to the container. The functional division into a lid station and a fastening station makes it possible to use stations which are designed especially for their respective function, thus contributing to a reliable operation of the device. The lid may be configured in many different forms. Thus, it may be a screw lid, a crown cork or a stopper cork to be pressed merely into the neck region of the container. Advantageously, the fastening station is designed, furthermore, for providing the filled container with a label. For this purpose, the fastening station may have a stamp, by means of which self-adhesive labels, for example, are pressed onto the filled container.

Advantageously, the enclosure employed for the mobile use of the apparatus is equipped with a cooling apparatus. Thus, even under adverse conditions of use, high process stability and therefore reliable operation of the apparatus can be ensured. Furthermore, the enclosure is advantageously equipped with an independent energy supply unit. It is thus possible to operate the novel apparatus on the spot in the region of action independently of the prevailing conditions. Preferably, the energy supply unit is operated with diesel fuel, such as is also used in land transport for the motor vehicles required for transport.

The fluid to be filled using the apparatus is, for example, a gas or a liquid. In the case of a liquid, it may be treated drinking water, refreshing beverages or juices. The container preform and therefore the container formed from the preform are preferably composed of PET (polyethyleneterephthalate), a thermoplastic from the family of polyesters which is produced by polycondensation. Using the novel apparatus, bottles, in particular PET bottles, may be advantageously formed and filled. These bottles may have a capacity volume of 0.5 liters, 1 liter, 1.5 liters or 2 liters. The novel apparatus is in this case designed for a throughput of up to 30 000 PET bottles per day.

It will be appreciated that the features mentioned above and those yet to be explained below can be used not only in the combinations specified in each case, but also in other combinations or alone, without departing from the scope of the present invention.

BRIEF DESCRIPTION OF THE DRAWINGS

Exemplary embodiments of the invention are illustrated in the drawings and are explained in more detail in the following description. In the drawings.

DESCRIPTION OF PREFERRED EMBODIMENTS

Figure 1:
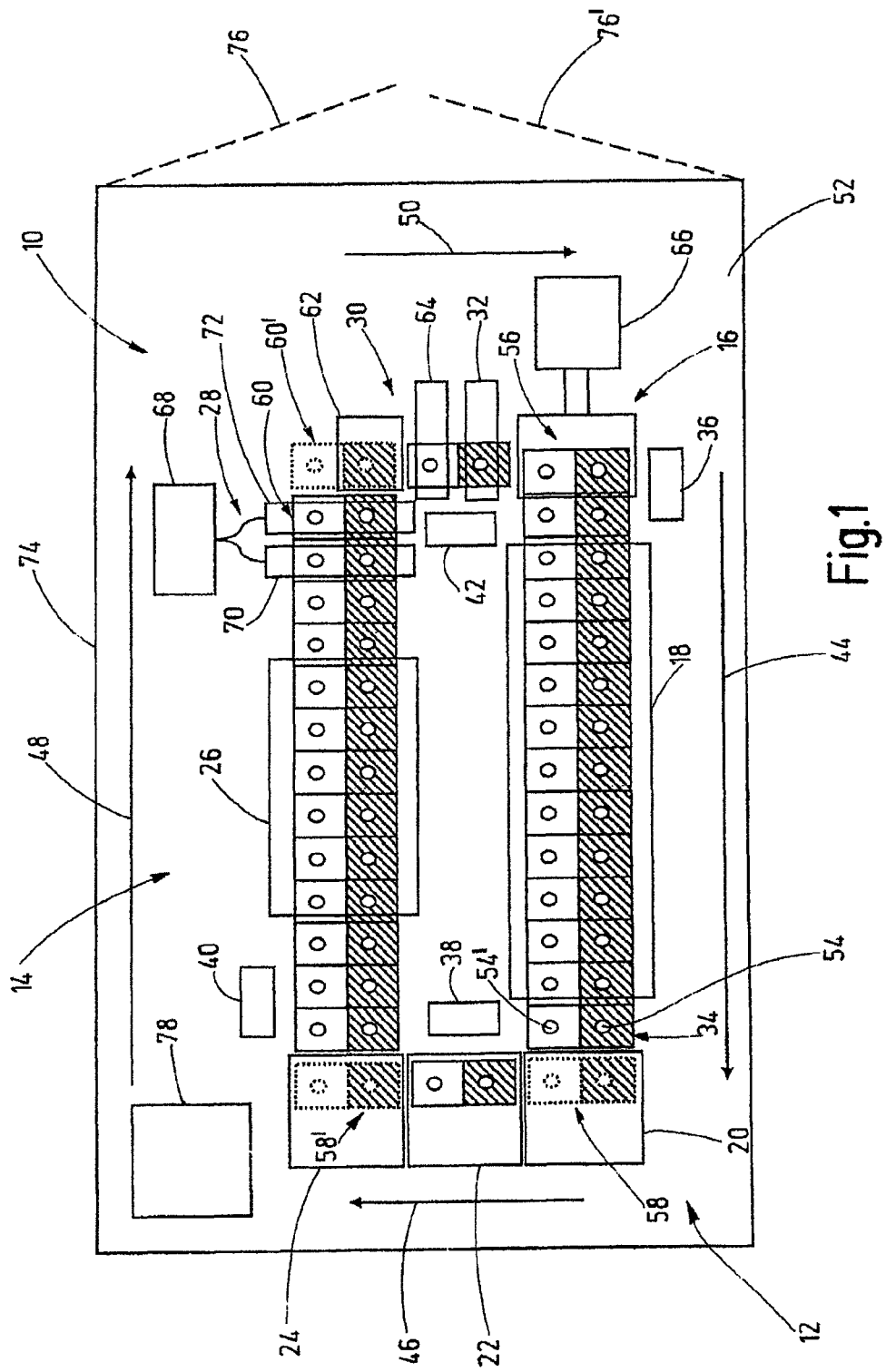
FIG. 1 shows a simplified illustration of an apparatus for automatically forming and filling containers according to a first exemplary embodiment.

In FIG. 1, an apparatus for automatically forming and filling containers is designated as a whole by reference numeral 10.

The apparatus 10 has a plurality of workstations 12 and a conveyer 14. The workstations 12 include an insertion station 16, a heating station 18, a temperature testing station 20, a container forming station 22, a container testing station 24, an irradiation station 26, a filling station 28, a closing station 30 and an ejection station 32. The conveyer 14 has a number of container carriers, one of which is designated by way of example by reference numeral 34 in FIG. 1. Furthermore, the conveyer 14 has a number of movement units moving the container carriers 34. These are a first movement unit 36, a second movement unit 38, a third movement unit 40 and a fourth movement unit 42. By means of the conveyer 14, a container preform and a container formed from the preform are moved between the individual workstations 12. For this purpose, a container carrier 34 is moved from the insertion station 16 via the heating station 18, the temperature testing station 20, the container forming station 22, the container testing station 24, the irradiation station 26, the filling station 28 and the closing station 30 to the ejection station 32. It is then moved from the ejection station 32 to the insertion station 16 again. During this entire movement sequence and the associated processing flow, the container preform and the container formed from the preform reside in a defined container carrier 34, namely in that carrier into which the container preform is inserted in the insertion station 16.

As may be gathered from the illustration in FIG. 1, an individual container carrier 34 moves on a closed trajectory composed of a plurality of movement segments. By means of the first movement unit 36, the container carrier 34 is moved along a first movement direction 44, specifically from the insertion station 16 via the heating station 18 toward the temperature testing station 20 in the present case. By means of the second movement unit 38, the container carrier 34 is moved along a second movement direction 46, the second movement direction 46 being oriented essentially orthogonally to the first movement direction 44. In this case, the container carrier 34 is moved from the temperature testing station 20 via the container forming station 22 toward the container testing station 24. By means of the third movement unit 40, the container carrier 34 is moved along a third movement direction 48, the third movement direction 48 being oriented essentially orthogonally to the second movement direction 46. The container carrier 34 is in this case moved from the container testing station 24 via the irradiation station 26 and the filling station 28 toward the closing station 30. By means of the fourth movement unit 42, the container carrier 34 is moved along a fourth movement direction 50, the fourth movement direction 50 being oriented essentially orthogonally to the third movement direction 48. The container carrier 34 is in this case moved from the closing station 30 to the ejection station 32.

The movement units 36, 38, 40, 42 are designed such that the container carrier 34 is moved in translational motion. Preferably, the movement units 36, 38, 40, 42 are electric drives in the form of servomotors. The individual container carrier 34 advances linearly on a closed trajectory. More precisely, it is displaced in translational motion along a trajectory. In this case, the container carrier 34 moves within a movement plane which is oriented essentially parallel to a plane defined by ground 52 on which the workstations 12 and the conveyer 14 are mounted.

An alternative configuration of the conveyer and therefore of the apparatus may also be envisaged, in which the container carrier does not move within a single movement plane, but within a plurality of movement planes which are oriented essentially parallel to one another. That is to say, the conveyer is designed such that the container carrier can not only be moved horizontally, but also such that it experiences a height change from a first movement plane toward a second movement plane. With this alternative, restrictions in the available construction height, such as may occur when the workstations and conveyer are accommodated in a container, can be compensated. A height change of the container carrier can be implemented in that the conveyer has rising and/or falling portions. Thus, for example, it may be advantageous if the container carriers are located, in the region of the insertion station, very far below, that is to say in a movement plane of a short distance from the bottom of the container, for example in order to facilitate gravity-induced insertion of the container preforms into the container carriers. Whereas, in the region of the container forming station, the container carriers may be located in a movement plane which is at a greater distance from the bottom of the container than that movement plane in the region of the insertion station.

In the present case, the container carriers 34 each have two pick-up regions 54, 54' for picking up two container preforms or two containers formed from the preforms. This should not be construed in a limiting manner. If the workstations have an appropriate configuration, the container carriers 34 may also have fewer or more than two pick-up regions. The hatching of the pick-up region 54 is intended to make it clear that the container carrier 34 maintains its orientation during the closed-loop movement. The closed-loop movement is composed only of translational movement sections and does not comprise any revolutionary movement sections here.

The container carriers 34 are moved in a clocked manner, this being described below, starting with a container carrier designated by reference numeral 56. The container carrier 56 is located in the insertion station 16. After the insertion of two container preforms, the container carrier 56 is moved along the first movement direction 44 to the left by the amount of one position. The container carrier designated by reference numeral 34 is thereby displaced into the temperature testing station 20, as indicated by a container carrier 58 illustrated by dashes. By means of the second movement unit 38, the container carrier 58 is displaced, in a first stroke, first from the temperature testing station 20 into the container forming station 22 and, in a second stroke, then from the container forming station 22 into the container testing station 24, in each case along the second movement direction 46. As soon as the container carrier 58 has left the temperature testing station 20, a further container carrier 56 located in the insertion station 16 can be displaced along the first movement direction 44 toward the temperature testing station 20 by means of the first movement unit 36. By means of the third movement unit 40, the container carrier 58' located in the container testing station 24 is displaced to the right along the third movement direction 48 by the amount of one position. The container carrier 60 located in the filling station 28 is thereby displaced into the closing station 30, as indicated by a container carrier 60' illustrated by dashes. As soon as the container carrier 58' has left the container testing station 24, the container carrier located in the container forming station 22 can be displaced into the container testing station 24 by means of the second movement unit 38.

As may be seen from the illustration in FIG. 1, the individual workstations 12 are designed differently with regard to the number of simultaneously processable container preforms and containers. Two container preforms can be processed simultaneously using the insertion station 16, the temperature testing station 20 and the container forming station 22. Two containers can be processed simultaneously in the container testing station 24 and the filling station 28. By contrast, only one container can be processed in each case both by the closing station 30 and by the ejection station 32. Consequently, both in the closing station 30 and in the ejection station 32, the processing of the containers must take place at double the clock rate, as compared with the other workstations. The container arranged in the pick-up region 54 is processed first in the closing station 30 and then the container arranged in the pick-up region 54'. The same applies correspondingly to the ejection station 32. The closing station 30 has a lid station 62 and a fastening station 64. As soon as the container carrier 60' has left the lid station 62, the next container carrier 60 is pushed up into the closing station 30 using the third movement unit 40. The container carrier 60' is displaced along the fourth movement direction 50 via the ejection station 32 toward the insertion station 16 by means of the fourth movement unit 42.

As already explained above, using the insertion station 16, a container preform is extracted from a bin 66 and, by being inserted into a defined container carrier 56, is assigned to the latter. By means of the heating station 18, the container preforms inserted in the container carriers 34 are preheated for the forming of the containers which takes place in the container forming station 22 and which is carried out at a predefined temperature. For this purpose, heating elements, not illustrated, are mounted in the heating station 18 along the first movement direction 44. In order to achieve uniform heating of the container preforms, these are turned on their way through the heating station 18. In the temperature testing station 20, a check is made as to whether a container preform has a temperature lying in a defined temperature range. The temperature range in this case defines those temperatures which are optimal for the forming which takes place in the container forming station 22. If the temperature of the preheated container preform does not lie in the defined temperature range, the container preform is separated out in the temperature testing station 20. A container is formed from the container preform in the container forming station 22, for example by the stretch blow molding method. In this case, the container preform is located in a finish-blowing mold which predetermines the form of the container. In this case, compressed air is first blown onto the container preform, a mandrel is then introduced into the container preform and this is stretched, and thereafter the container preform is finish-blown out by means of compressed air. In the container testing station 24, a check is made as to whether the container formed in the container forming station 22 fulfills a number of defined forming criteria. In this case, for example, a check is made as to whether the container is formed in the proper way, that is to say has a defined form. Also, a check can be made as to whether the formed container has a hole in its sidewall or in its bottom. If the formed container does not fulfill one of the forming criteria, it is separated out in the container testing station 24. Separating out, which takes place in each case in the temperature testing station 20 and in the container testing station 24, can avoid damage in the individual workstations 12 and therefore permanent faults.

In the irradiation station 26, the formed container is irradiated with UV radiation at least over part of its circumference. Preferably, the formed container is irradiated in its neck region, in order to kill germs possibly located there. This step is carried out since the neck region of the container preform and of the container formed from the preform is not exposed to the temperatures in the container forming station 22, as is the case with regard to the body region of the container. On account of the high temperatures prevailing in the container forming station 22, germs possibly located in the body region of the container have already been killed.

In the filling station 28, the formed container is filled with a fluid located in a fluid vessel 68. The fluid may be a gas or a liquid. Preferably, it is treated drinking water. Advantageously, the filling station 28 is of two-stage construction and is composed of a prefilling station 70 and of a finish-filling station 72. By means of the prefilling station 70, a first volume of the fluid is introduced under higher pressure into the container. By means of the finish-filling station 72, a second volume having a lower pressure is introduced into the container. Preferably, the first volume amounts to 80% of the final volume and the second volume to 20% of the final volume. However, another division between these two volumes may also be envisaged. Instead of the two-stage construction, it is also conceivable for the filling station to have an only single-stage construction.

By means of the lid station 62, a lid is placed onto the filled container. This is then releasably fastened to the container by means of the fastening station 64. Preferably, the lid is designed as a screw lid and the fastening station 64 as a screw station. Advantageously, the lid station 64 is also designed for applying a label to the filled container. By means of the ejection station 32, the closed container is ejected from the container carrier 34. This may take place actively, for example by means of a ram acting upon the container from above. Alternatively, this may take place passively if the container carrier 34 is designed such that the filled container falls out of it downward by itself due to gravity.

With a view to a complete production process which commences with the forming of a container from a container preform and extends via the filling of the container up to the ejection of the container, the apparatus 10 comprises at least one insertion station 16, one container forming station 22, one filling station 28, one closing station 30 and one ejection station 32.

For mobile use of the apparatus 10, the workstations 12 and the conveyer 14 are arranged stationarily in an enclosure 74. This enclosure 74 is preferably designed as a 20-foot container and is accessible on foot, as indicated by open doors 76, 76'. In order to ensure optimal process stability, a cooling unit 78 is arranged in the enclosure 74. The illustration of an energy supply unit, by means of which the workstations 12 and the conveyer 14 are supplied with energy, has been dispensed with in FIG. 1.

The simplified illustration in FIG. 1 is not intended to have any restrictive effect in terms of an actual structural configuration of the apparatus or of individual components thereof This also applies particularly to the number of container preforms and containers which can be processed in the individual workstations. Thus, workstations may be used which are modified in relation to the workstations illustrated and by means of which a different number of container preforms or containers can be processed. Also, a plurality of examples of one type of workstation may be used in parallel. For example, it is conceivable to use a plurality of container forming stations together in parallel, a correspondingly modified heating station and, if appropriate, a plurality of filling stations being employed. Modified lid stations, fastening stations and filling stations may also be employed correspondingly. The apparatus may be configured individually, depending on the required clock cycle time of the individual production steps or work steps to be carried out at the workstations.

Figure 2:
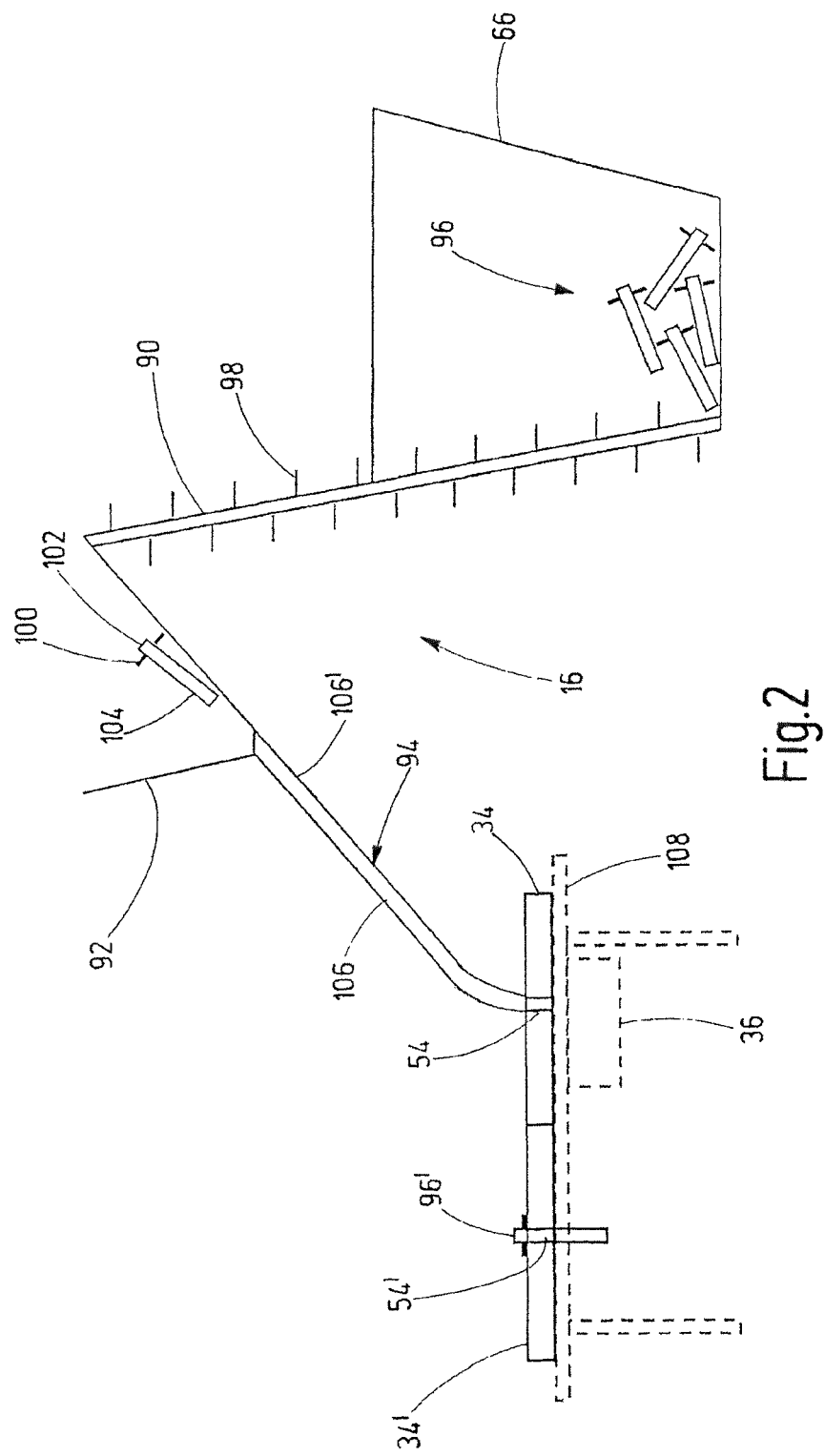
FIG. 2 shows a simplified illustration of an insertion station used in the apparatus.

FIG. 2 illustrates the insertion station 16. The insertion station 16 comprises a transport unit 90, a funnel element 92 and a conveying section 94 in the present case. The bin 66 contains a number of container preforms 96. The container preforms 96 are conveyed into the funnel element 92 via the transport unit 90. For this purpose, the transport unit 90 is designed, for example, as a rotating conveyor belt with driving projections, one of which is designated by way of example by reference numeral 98.

As indicated in FIG. 2, the container preform 96 has a collar 100 which subdivides the container preform 96 into a neck region 102 and a body region 104. On account of the gravity acting upon the container preform 96, the container preform 96 is oriented in the funnel element 92 such that it leaves the funnel element 92 with the body region 104 in front. After leaving the funnel element 92, the container preform 96 is suspended automatically in the conveying section 94. The conveying section 94 is preferably composed of two rails 106, 106' which run in parallel and which, starting from the funnel element 92, are directed downward toward the container carrier 34 to be loaded. The container preform 96 is supported with its collar 100 on the two rails 106, 106', its body region 104 pointing downward in the direction of the container carrier 34. The container preform thus hangs vertically between the rails 106, 106' arranged on the left and right of it. Via the conveying section 94, the container preform 96 is fed to the container carrier 34 and inserted into the pick-up region 54 of the latter. On the left next to the container carrier 34 to be loaded, an already loaded container carrier 34' is illustrated, in the pick-up region 54' of which a container preform 96' is inserted. The insertion station 16 is designed such that container preforms can be inserted into both pick-up regions 54, 54' of the container carrier 34. For this purpose, the insertion station 16 has, for example, a second conveying section 94', not illustrated in FIG. 2. Alternatively, the funnel 92 may be designed pivotably, so that container preforms can be alternately inserted into the two pick-up regions 54, 54'. The illustration of a corresponding pivoting mechanism has been dispensed with in FIG. 2.

Using the insertion station 16, the container preforms 96 located in the bin 66 are singled out. The conveying section 94 may be equipped with a separating element, by means of which container preforms 96 which have built up in the conveying section 94 are separated from one another for insertion into the container carrier 34 and are thus admitted singly in the direction of the container carrier 34 to be loaded. By means of the insertion station 16, the container preforms 96 are inserted into the container carrier 34 from above as a result of a gravity-induced movement. As soon as container preforms 96 are inserted in both pick-up regions 54, 54' of the container carrier 34, the latter is displaced in the direction of the heating station 18 and temperature testing station 20. For this purpose, the container carrier 34 located on a guide stand 108 is displaced by means of the first movement unit 36. As indicated in FIG. 2, the container carriers 34 are displaced on a guide stand 108 along all the movement directions 44, 46, 48, 50. In order to prevent the container carriers 34 from falling down laterally, the guide stand 108 is equipped with lateral guide rails, not illustrated.

Figure 3:
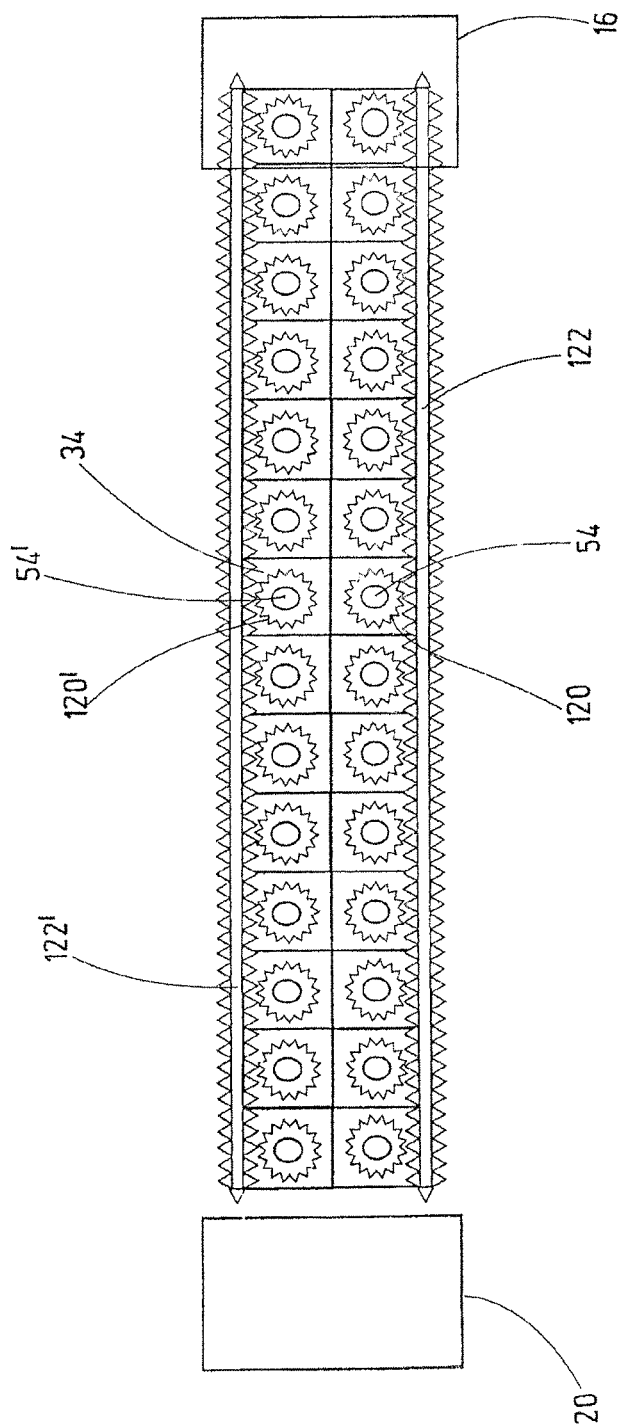
FIG. 3 shows a simplified illustration of a number of container carriers used in the conveyer.

FIG. 3 illustrates in more detailed form the container carriers arranged between the insertion station 16 and the temperature testing station 20, one of these container carriers being designated by way of example by reference numeral 34. Each of the container carriers 34 has two gearwheels 120, 120' which are in each case arranged concentrically to one of the two pick-up regions 54, 54'. The gearwheel 120 engages into a toothing element 122 and the gearwheel 120' engages into a toothing element 122'. The two toothing elements 122, 122' are arranged laterally on a guide stand 108 which cannot be seen in FIG. 3 on account of the type of illustration. The cooperation of the gearwheels 120, 120' with the respective toothing element 122, 122' gives rise, during the movement of the container carrier 34, to rotation of the respective gearwheel 120, 120' and therefore also of the container preform 96, 96' arranged in the respective pick-up region 54, 54'. As a result, during the movement of the container carrier 34 along the first movement direction 44, i.e., during its movement through the heating station 18, permanent rotation of the container preform 96 is achieved, thus leading to the uniform heating of the latter. The rotational movement which the container preform 96 in this case executes with respect to the container carrier 34 does not constitute a relative movement in the sense of a hand-over movement or grip-around movement. The two toothing elements 122, 122' may be designed, for example, as rigid racks or as flexible revolving toothed belts. In the case of racks, the container preform 96, 96' is rotated on account of a relative movement which occurs between the gearwheel 120, 120' and the respective rack during the movement of the container carrier 34. In the case of toothed belts, the container preform 96, 96' can be rotated additionally as a result of the revolving of the toothed belts, with the result that more uniform heating of container preform 96, 96' is possible. The container preforms 96, 96' can be moved even when the container carrier 34 itself does not execute any movement. An illustration of the heating station 18 has been dispensed with in FIG. 3. On account of the higher reliability, the two toothing elements 122, 122' are preferably designed as racks.

Figure 4:
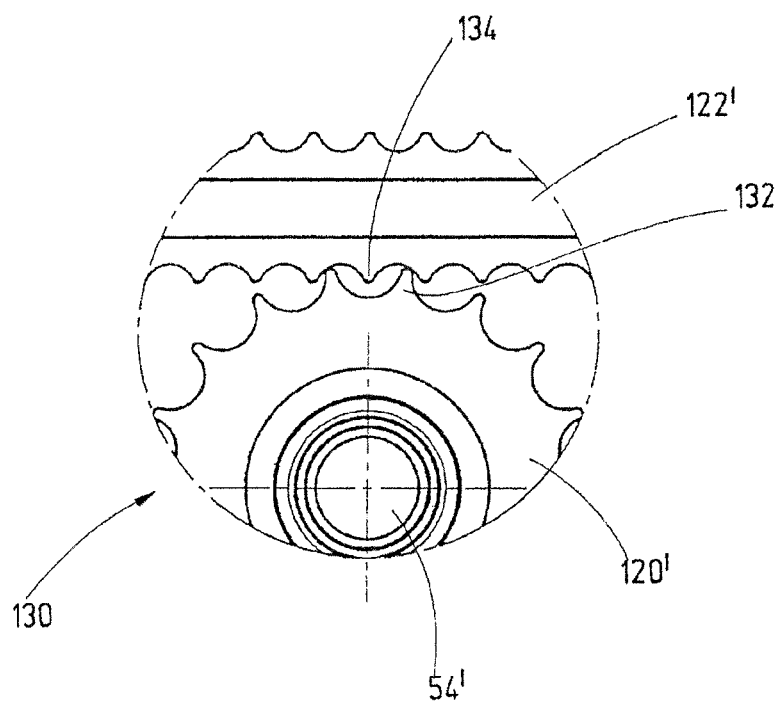
FIG. 4 shows a detail of a container carrier.

FIG. 4 shows a detail 130 of the container carrier 34. The detail 130 shows the cooperation of gearwheel teeth 132 of the gearwheel 120' with toothing element teeth 134 of the toothing element 122'. The container preform and the container are thus mounted rotatably in the container carrier.

Figure 5:
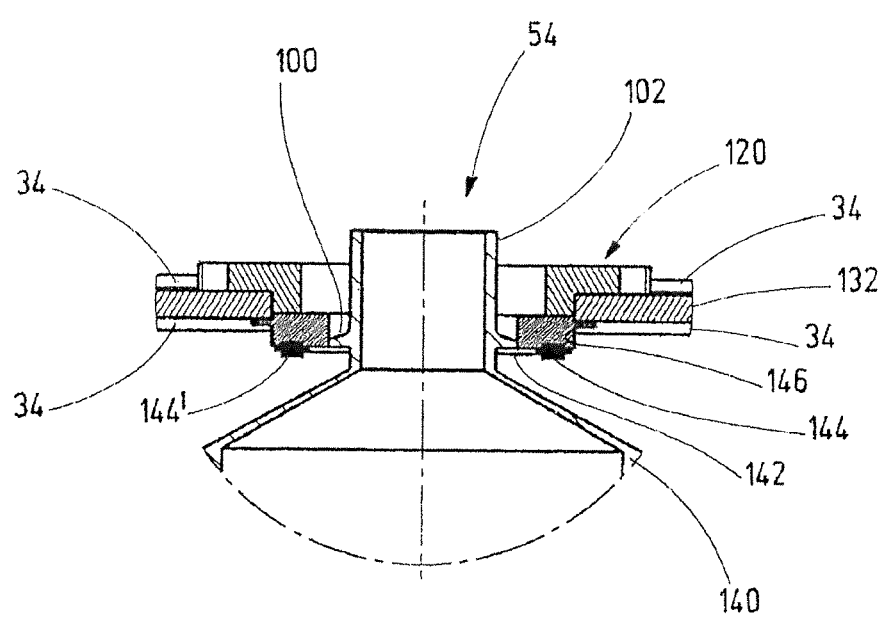
FIG. 5 shows a sectional illustration of a container carrier with a container inserted therein.

FIG. 5 shows a sectional illustration of a container 140 which is inserted in a pick-up region 54 of a container carrier 34. The container 140 has in its neck region 102 a collar 100 with which it lies on a spring element 142. The spring element 142 is fastened to a mounting element 146 of the container carrier 34 via fastening elements 144, 144'. Preferably, the spring element 142 is releasably fastened, so that it can be exchanged, as required. The gearwheel 120 is also fastened on the mounting element 146. The spring element 142 is designed such that, on the one hand, a container preform 96 inserted into the spring element 142 from above is held. On the other hand, the spring element 142 makes it possible to extract a filled and subsequently closed container 140 downward. In this case, the spring element 142 is preferably dimensioned such that a filled container 140 can fall out downward by itself due to gravity. For the sake of clarity, an illustration of a thread in the neck region 102 of the container 140 has been dispensed with in FIG. 5.

Figure 6:
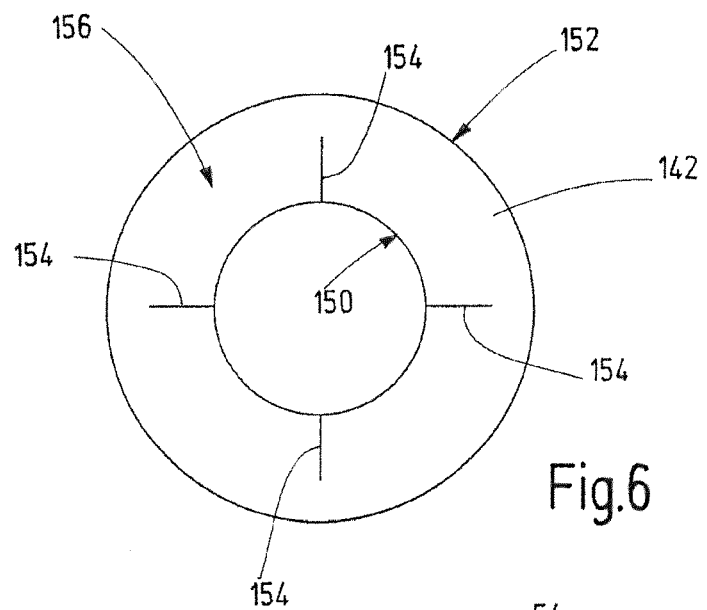
FIG. 6 shows a simplified illustration of a spring element arranged in the container carrier.

FIG. 6 illustrates the spring element 142. This is a thin annular disk with an inner edge 150 and with an outer edge 152. The inner edge 150 has in this case a diameter such that both a container preform 96 and a container 140 are held, without too much play, by the spring element 142 by the respective collar 100 being gripped underneath. The disk has a plurality of slots 154 starting at the inner edge 150 and running over part of the ring width 156 toward the outer edge 152. Overall, the inner edge 150 of the disk is designed such that a container preform 96 inserted from above is held by its collar 100 being gripped underneath, and a filled container 140 can be extracted downward out of the spring element 142 and therefore out of the container carrier 34. An illustration of holes for the purpose of fastening the spring element 142 to the mounting element 146 by means of fastening elements 144, 144' has been dispensed with. The illustration of slots 154 running rectilinearly should not be construed in a limiting manner. The slots may have any desired form; for example, they may be of arcuate form.

Figure 7:
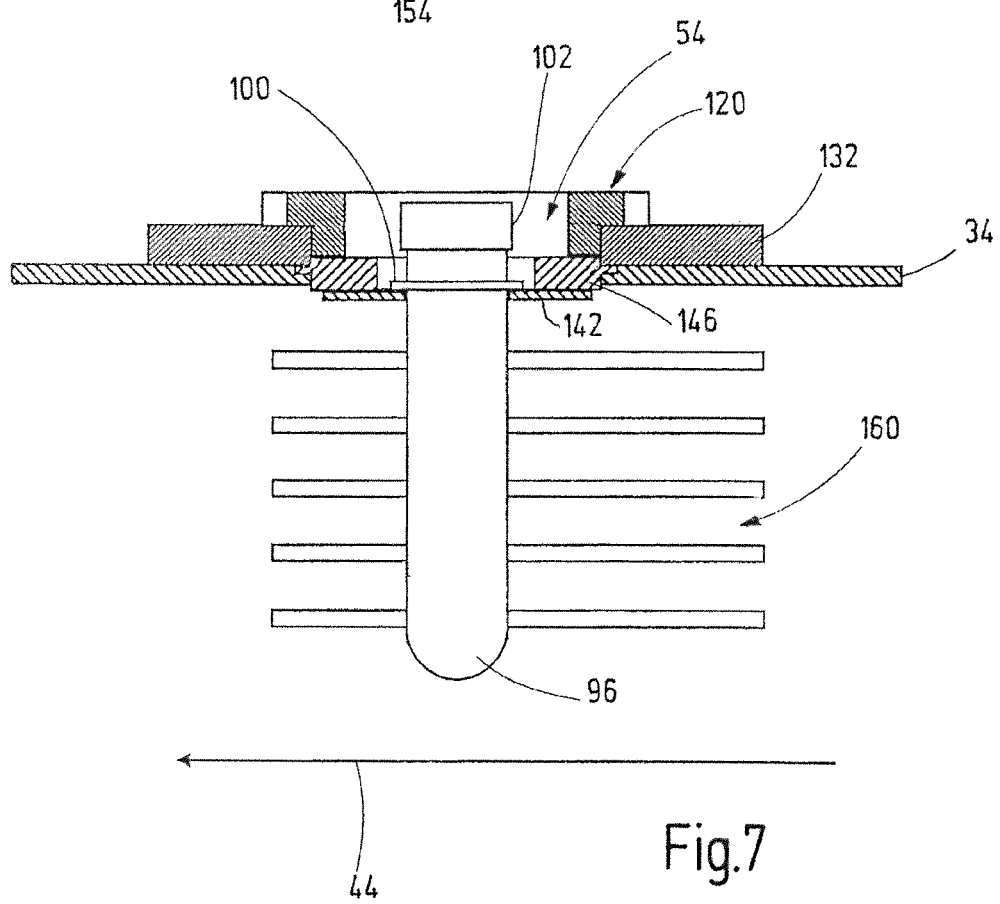
FIG. 7 shows a sectional illustration of a container carrier with a container preform in inserted therein, located in the region of the heating station.

FIG. 7 shows a container carrier 34 in an embodiment which is slightly modified, as compared with the illustration in FIG. 5. A container preform 96 is inserted into the container carrier 34 and is held by a spring element 142 by the collar 100 being gripped underneath. The spring element 142 is fastened to the container carrier 34 via a mounting element 146. A gearwheel 120 is likewise fastened to the mounting element 146. The illustration of fastening elements 144, 144' has been dispensed with. The mounting element 146 is fixed in a longitudinal direction by means of a securing element which is attached in a continuous groove on the mounting element 146 below the container carrier 34. The longitudinal direction is in this case defined by the axis of rotation of the container preform. The mounting element 146 can easily be exchanged by the securing element being released. The securing element may be, for example, a saw ring.

The container carrier 34 and therefore the container preform 96 inserted in it are moved along the first movement direction 44 past heating elements 160 arranged in the heating station 18. The heating elements 160 may in this case be designed, for example, as electrically operated heating bars. In this case, heating bars, the length of which corresponds to the length of the heating station 18, may be used. It is also conceivable, however, to arrange a plurality of shorter heating bars one behind the other over the entire length of the heating station 18.

Figure 8:
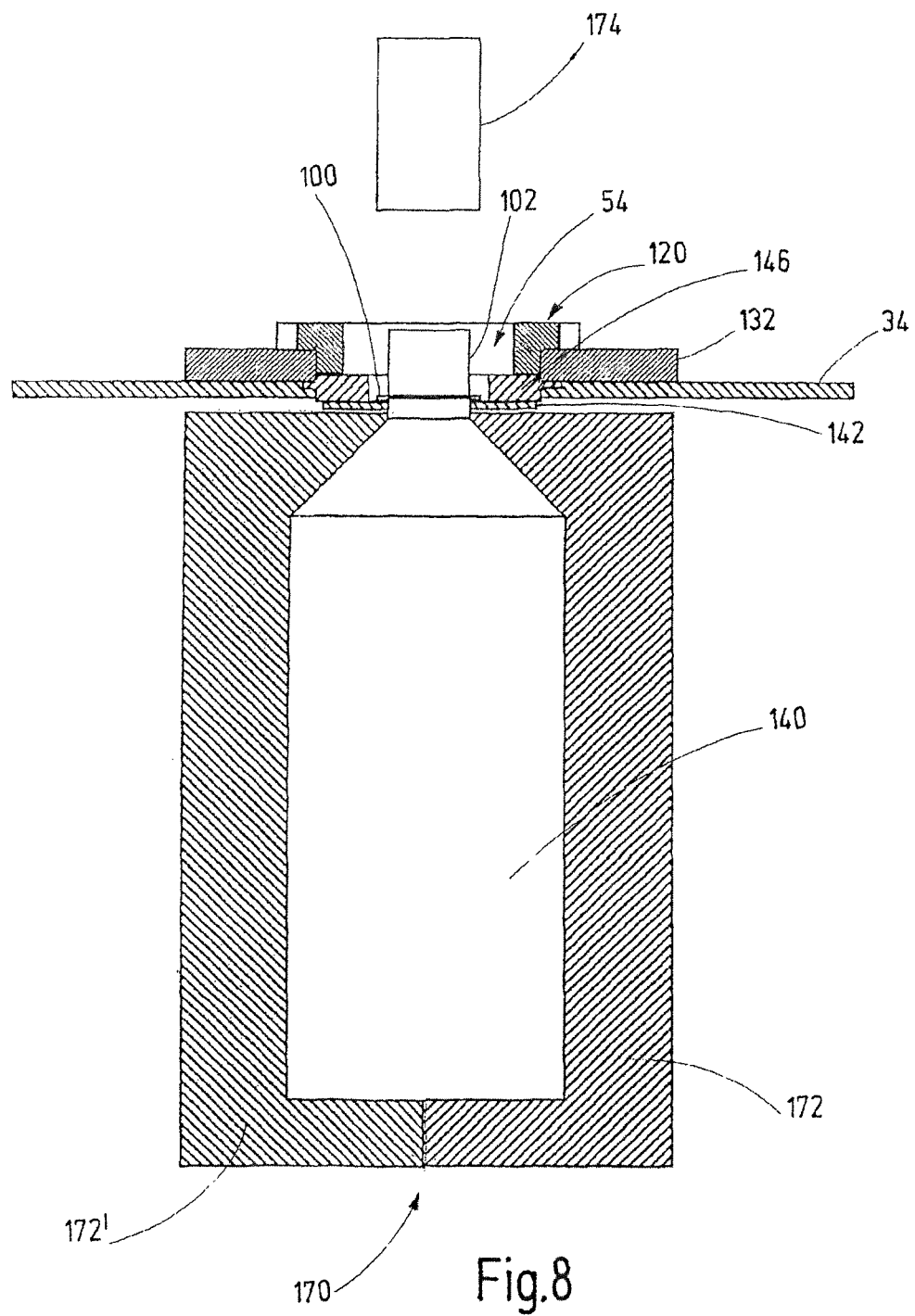
FIG. 8 shows a sectional illustration of a container carrier with a container inserted therein, located in the region of the container forming station.

FIG. 8 illustrates a container 140 which is arranged in a container carrier 34 and is located in the container forming station 22. The container carrier 34 corresponds in its construction to the container carrier illustrated in FIG. 7. The container 140 is carried by the spring element 142 by the collar 100 of said container being gripped underneath. In the container forming station 22, the container 140 is formed from a container preform 96. This takes place by what is known as a stretch blow-molding method. In this case, in a first step, a small quantity of compressed air is first introduced into the container preform 96, and in a second step a mandrel is introduced into the container preform 96 in order to stretch the latter. Then, finally, in a third step, a large quantity of compressed air is introduced into the stretched container preform and the latter is finish-blown out to form the container 140. FIG. 8 shows the finish-blown-out container 140 which is still located in a finish-blowing mold 170 which is composed of two mold halves 172, 172'. Preferably, the two mold halves 172, 172' are designed to be heatable. A feed is designated by reference numeral 174. Via this feed 174, on the one hand, compressed air is introduced into the container preform 96. On the other hand, via this feed 174, the mandrel for stretching the container preform 96 is also introduced.

The two mold halves 172, 172' are designed to be movable. They can be moved in each case horizontally, specifically transversely with respect to the direction of advance of the container preform or containers. During the advancing movement of the container preforms into the container forming station and during the advancing movement of the containers out of the container forming station, the two mold halves 172, 172' are arranged in an open position and thus open the way for the container preforms or containers.

Figure 9:
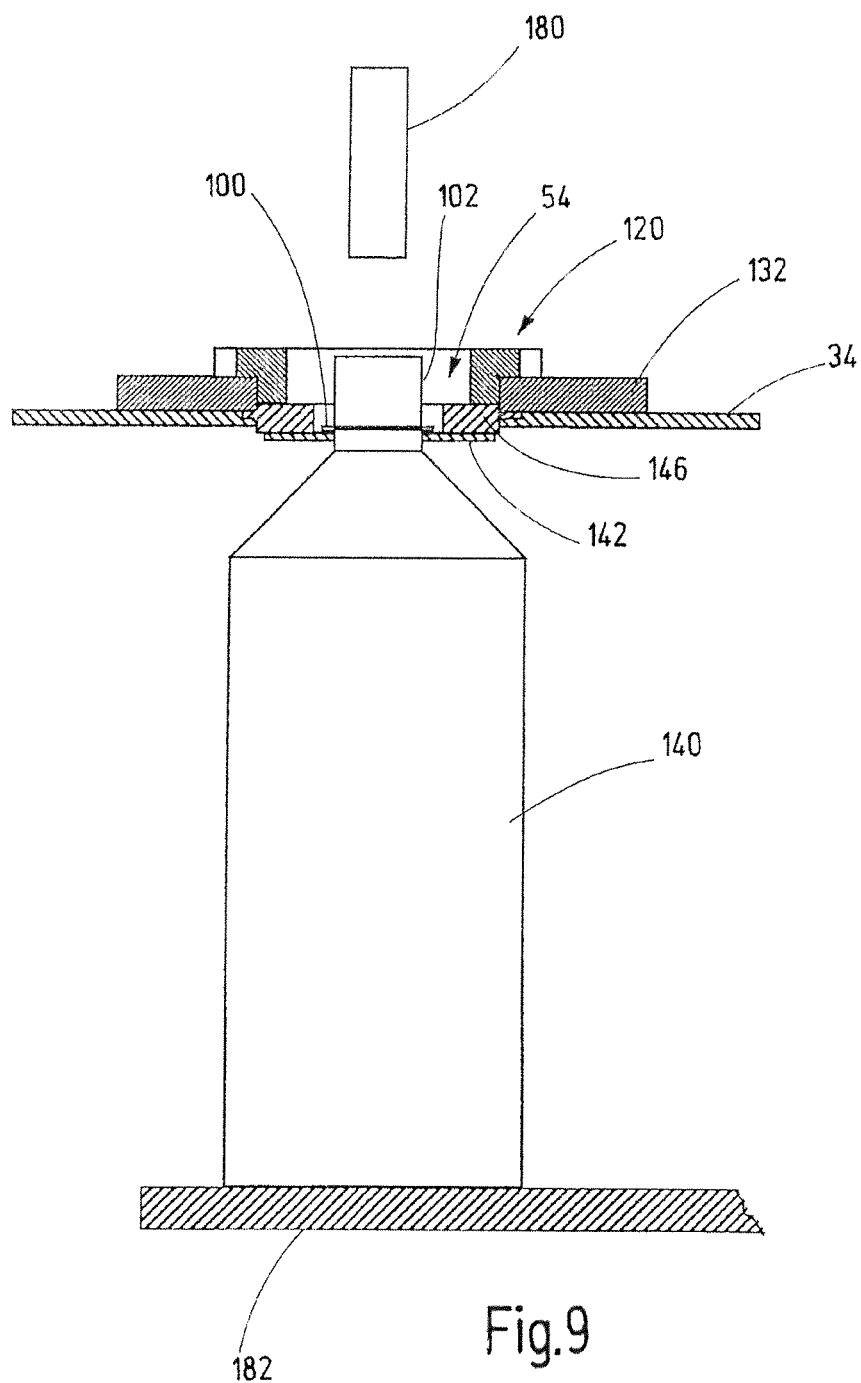
FIG. 9 shows a sectional illustration of a container carrier with a container inserted therein, located in the region of the filling station.

FIG. 9 shows a container 140 which is inserted into a container carrier 34 and is located in the filling station 28. The container carrier 34 corresponds in its construction to the container carriers which are illustrated in FIGS. 7 and 8. In the filling station 28, a fluid is introduced into the container 140 via a filler piece 180. The illustration in FIG. 9 in this case leaves undecided whether the container 140 is in the prefilling station 70 or in the finish-filling station 72.

As already stated above, the ejection station 32 and consequently also the spring element 142 may be designed according to two different approaches. According to a first approach, the ejection station 32 is designed as a passive ejection station. In this case, the spring element 142 is dimensioned such that the filled container 140 in the ejection station 32 falls out of the container carrier 34 downward by itself due to gravity. That is to say, the filled container 140 does not have to be acted upon actively in the ejection station 32 in order to extract it from the container carrier 34. In this case, starting with the filling station 28, a guide plate 182 is to be provided which is arranged below the container 140 to be filled, so that, after the end of the filling operation, the container 140 does not fall out of the container carrier 34 downward by itself due to gravity as early as in the filling station 28. The guide plate 182 extends from the filling station 28 via the closing station 30 as far as the ejection station 32. According to a second approach, the ejection station 32 is designed as an active ejection station. In this case, the spring element 142 does not have to be dimensioned such that the filled container 140 falls out of the container carrier 34 downward by itself due to gravity. Instead, the container 140 is acted upon actively in the ejection station 32, for example by means of a ram, in order to press said container downward out of the spring element 142 and therefore out of the container carrier 34 by the application of force. In this case, said guide plate 182 may be dispensed with.

Figure 10:
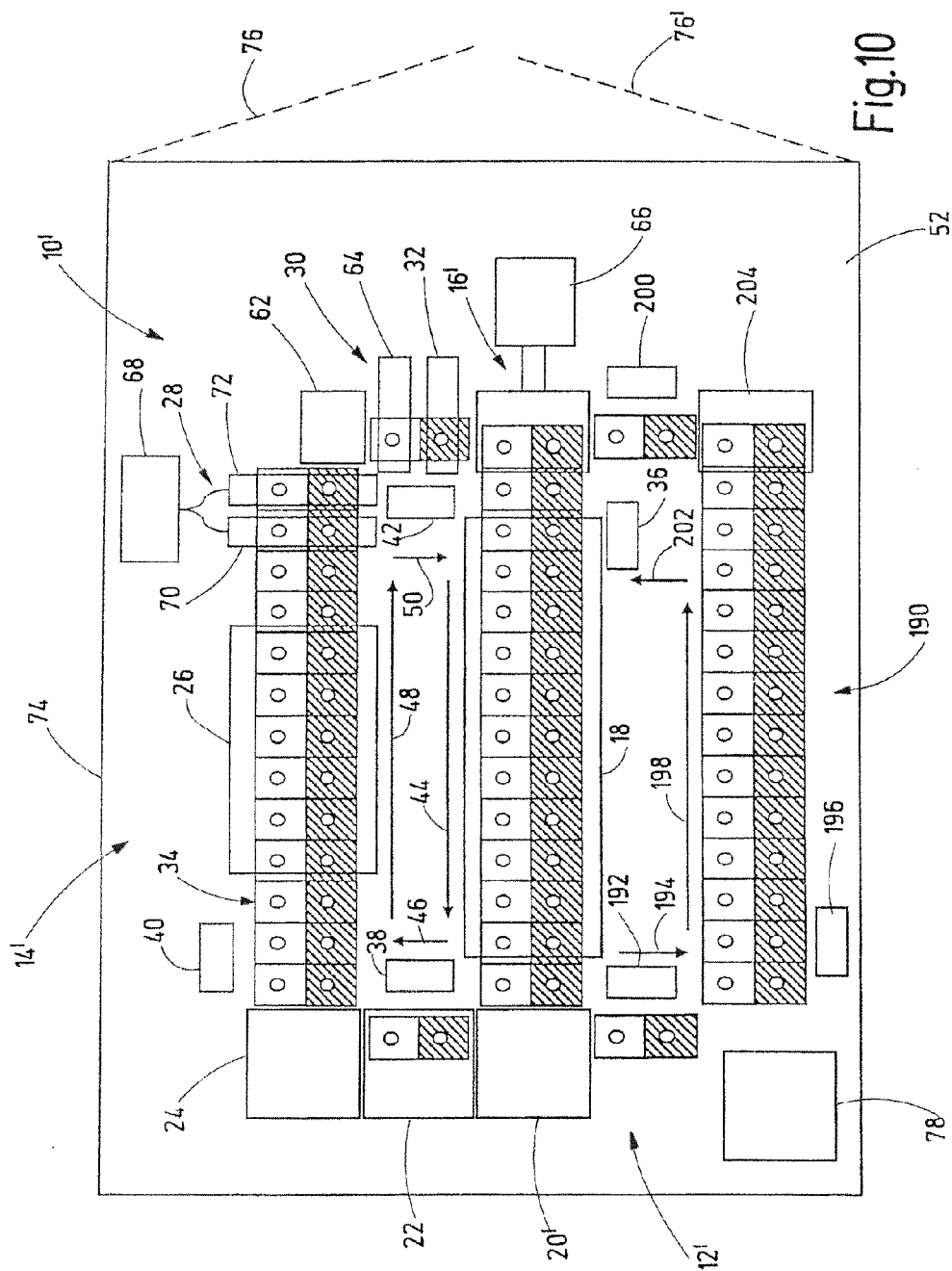
FIG. 10 shows a diagrammatic illustration of the apparatus for automatically forming and filling containers according to a second exemplary embodiment.

FIG. 10 illustrates an apparatus 10' for automatically forming and filling containers according to a second exemplary embodiment.

The apparatus 10' illustrated in FIG. 10 differs from the apparatus 10 illustrated in FIG. 1 in that the apparatus 10' additionally has a return branch 190. By means of the return branch 190, a container preform 96 for which it has been found in the temperature testing station 20' that its temperature does not lie in the defined temperature range can be fed to the insertion station 16'. For this purpose, the conveyer 14' comprises a fifth movement unit 192, by means of which a container carrier 34 can be moved along a fifth movement direction 194. The fifth movement direction 194 is in this case oriented essentially orthogonally to the first movement direction 44 and antiparallel to the second movement direction 46. Furthermore, the conveyer 14' comprises a sixth movement unit 196, by means of which a container carrier 34 can be moved along a sixth movement direction 198, the sixth movement direction 198 being oriented essentially orthogonally to the fifth movement direction 194. Furthermore, the conveyer 14' has a seventh movement unit 200, by means of which a container carrier 34 can be moved along a seventh movement direction 202, the seventh movement direction 202 being oriented essentially orthogonally to the sixth movement direction 198.

By means of the movement units 192, 196, 200, a container carrier 34 can be moved from the temperature testing station 20' via an ejection station 204 toward the insertion station 16'. In the ejection station 204, a container preform 96 which is located in the container carrier 34 and the temperature of which does not lie in the defined temperature range is removed from the container carrier 34. In this case, in the event that the container preform 96 has not been damaged on account of incorrect heating, it is conceivable to feed said container preform to the production process anew and thus introduce it into the bin 66. Preferably, this also takes place via the return branch 190 in the case of faults in the container forming station 20' or in the case of faults in the filling station 28.

Components which are illustrated in FIG. 10 and correspond in construction and function to a component illustrated in FIG. 1 are identified by the same reference numerals and are therefore not described in any more detail. Instead, reference is made to the statements relating to FIG. 1.

Contrary to the illustration in FIG. 10, it is conceivable to provide, instead of an independent second movement unit 38 and an independent fifth movement unit 192, a single movement unit which enables a container carrier 34 to execute both movement in the second movement direction 46 and movement in the fifth movement direction 194. The same applies correspondingly to the fourth movement unit 42 and to the seventh movement unit 200. Furthermore, an alternative construction of the return branch 190 may be envisaged. The alternative return is of arcuate form. Preferably, the container carriers in the return branch 190 move on a semicircular trajectory. Alternatively, the trajectory may be composed of two quarter circle paths which are connected to one another via a straight path segment. The arcuately formed return branch 190 has the advantage that only one movement unit is required instead of three. Moreover, fewer container carriers are required for the return.

For the devices illustrated in FIG. 1 and FIG. 10, the control procedure is presented as follows: insertion of a container preform, heating of the container preform, stretch blow-molding of the container preform into a container, filling of the container, closing of the container, labeling of the container and ejection of the labeled and closed container.

For the apparatus 10, if there is a fault found in the temperature testing station 20, the operating procedure is presented as follows: the container preform found to be faulty is separated out directly, without return, at the temperature testing station 20. In the case of the apparatus 10', the container preform found to be faulty, although also being separated out in the temperature testing station 20', is fed via the return branch to an ejection station 32, whereby it is possible, where appropriate, to feed this container preform to the production process again by insertion in the insertion station 16'.

If a fault is detected in the container testing station 24, both in the case of the apparatus 10 and in the case of the apparatus 10' the container found to be faulty is separated out directly, without return, at the container testing station 24. Moreover, it is stored in a memory which container carrier is moved further on without a container, so that the execution of work steps at the following workstations can be avoided.

Using the novel apparatus, bottles can be picked up at a defined position, which is independent from the bottle production process, namely the collar located in the neck region, in a bottle carrier and can be guided through the complete plant for bottle production and bottle filling. Within complete bottle production and filling, there is no need for any hand-over stations, with the exception of the insertion station and ejection station. The apparatus is thus designed to be gripper-free. Faulty bottles produced in the bottle blowing station can be detected and separated out. These therefore do not cause a stoppage of the plant. Overall, operating faults in the region of the bottle blowing station or in the region of the bottle filling station do not lead to faults or damage in another plant part.

It may be noted at this occasion that the illustration which is partially simplified in the figures should not be construed in a limiting manner with respect to the actual structural configuration of individual components installed in the device, such as, for example, individual workstations or the conveyer or components thereof. Also, illustrating one and the same component sometimes in a different size in the figures is not intended to have any restrictive effect.

What is claimed is:

1. An apparatus for automatically forming and filling containers, comprising:
    a plurality of workstations,
    a conveyer that comprises a number of container carriers and a number of movement units for moving the container carriers,
    with the plurality of workstations at least comprising an insertion station, a container forming station, a tilling station, a closing station, and an ejection station,
    with the insertion station being designed for feeding a first container preform into a first of the container carriers, thereby assigning the container preform to the first container carrier, the first container carrier receiving a neck region of the first container prefrom and suspending the first container preform therefrom,
    with the container forming station being designed for forming a first container from the first container preform,
    with the filling station being designed for filling the first container with a fluid,
    with the closing station being designed for closing the filled first container, and with the ejection station being designed for ejecting the filled and closed first container out of said one container carrier, wherein the conveyer is designed for moving the container carriers from the insertion station via the container forming station, the filling station and the closing station to the ejection station, and wherein the first container preform and the first container formed from the first container preform continuously reside in the first container carrier with the first container carrier contacting the neck region thereof while the conveyor moves the first container carrier from the insertion station via the container forming station, the filling station and the closing station to the ejection station.

2. The apparatus of claim 1, wherein the conveyor is designed for moving the container carriers on a closed trajectory from the insertion station via the container forming station, the filling station, the closing station and the ejection station back to the insertion station.

3. The apparatus of claim 2, wherein the conveyer comprises a return branch for accommodating container carriers branched off from the closed trajectory.

4. The apparatus of claim 1, wherein the number of movement units comprise a first and a second movement unit, the first movement unit being designed for moving the container carriers along a first movement direction, the second movement unit being designed for moving the container carriers along a second movement direction, and the second movement direction being oriented transverse to the first movement direction.

5. The apparatus of claim 4, wherein the second movement direction is oriented orthogonally to the first movement direction.

6. The apparatus of claim 4, wherein the conveyer comprises a third movement unit designed for moving the container carriers along a third movement direction, the third movement direction being oriented transverse to the second movement direction.

7. The apparatus of claim 1, wherein the movement units are designed for moving the container carriers in translational motion.

8. The apparatus of claim 1, wherein the movement units are designed for moving the container carriers within a defined movement plane.

9. The apparatus of claim 1, wherein the insertion station is designed for inserting the first container preform into the first container carrier from above using a gravity-induced movement.

10. The apparatus of claim 1, wherein the first container carrier comprises a spring element designed for holding the first container preform inserted into the spring element from a first side and for extracting the formed and filled first container from a second side opposite the first side.

11. The apparatus of claim 10, wherein the spring element is dimensioned such that the filled first container falls downwardly due to gravity.

12. The apparatus of claim 10, wherein the neck region of the first container preform comprises a collar, with the spring element being designed as an annular disk with an inner edge holding the first container preform at the collar.

13. The apparatus of claim 11, wherein the disk has a plurality of slots defining a holding force for holding the first container preform and the first container.

14. The apparatus of claim 1, further comprising a transportable enclosure in which the workstations and the conveyer are stationarily arranged.

15. The apparatus of claim 1, wherein the workstations further comprise at least one of the following workstations:

a heating station designed for preheating the first container preform for the subsequent forming of the container in the container forming station, a temperature testing station designed for testing if the first container preform has a temperature lying in a defined temperature range, a container testing station designed for testing if the formed first container fulfils a number of predefined forming criteria, an irradiation station designed for irradiating the formed first container at least partly with UV radiation.

16. The apparatus of claim 1, wherein the fluid contains drinking water obtained from purifying raw water.

17. A method for automatically forming and filling containers by an apparatus which has a conveyor and a plurality of workstations comprising an insertion station, a container forming station, a filling station, a closing station and an ejection station, the method comprising feeding a container preform into a container carrier by using the insertion station, thereby assigning the container preform to the container carrier, forming a container from the container preform by using the container forming station, filling the formed container with a fluid by using the filling station, closing the filled container by using the closing station, and ejecting the filled and closed container out of the container carrier by using the ejection station, wherein the container carrier is moved through the insertion station via the container forming station, the filling station and the closing station to the ejection station by the conveyer without any handover between stations, and wherein the container preform and the container formed from the preform continuously reside in the container carrier assigned to the container preform.

18. The method of claim 16, wherein the fluid contains drinking water obtained from purifying raw water.

19. An apparatus for automatically forming and filling containers, comprising:

a conveyer that comprises at least a movable first container carrier and multiple movement units for moving the first container carrier, a plurality of workstations at least comprising an insertion station, a container forming station, a filling station, a closing station, and an ejection station, wherein the insertion station is designed for feeding a first container preform into the first container carrier, thereby assigning the first container preform to the first container carrier, moving the first carrier with the first container preform to the container forming station and forming a first container from the first container preform, moving the first carrier with the formed first container to the filling station and filling the first container with a fluid, moving the first carrier and the filled first container to the closing station and closing the first container, and moving the first carrier and closed first container to the ejection station and ejecting the closed first container out of the first carrier.

* * * * *